April 11, 1939.   C. C. CHAMBERS   2,154,375
COMPENSATED CONTROL SYSTEM
Filed April 25, 1936   3 Sheets-Sheet 1
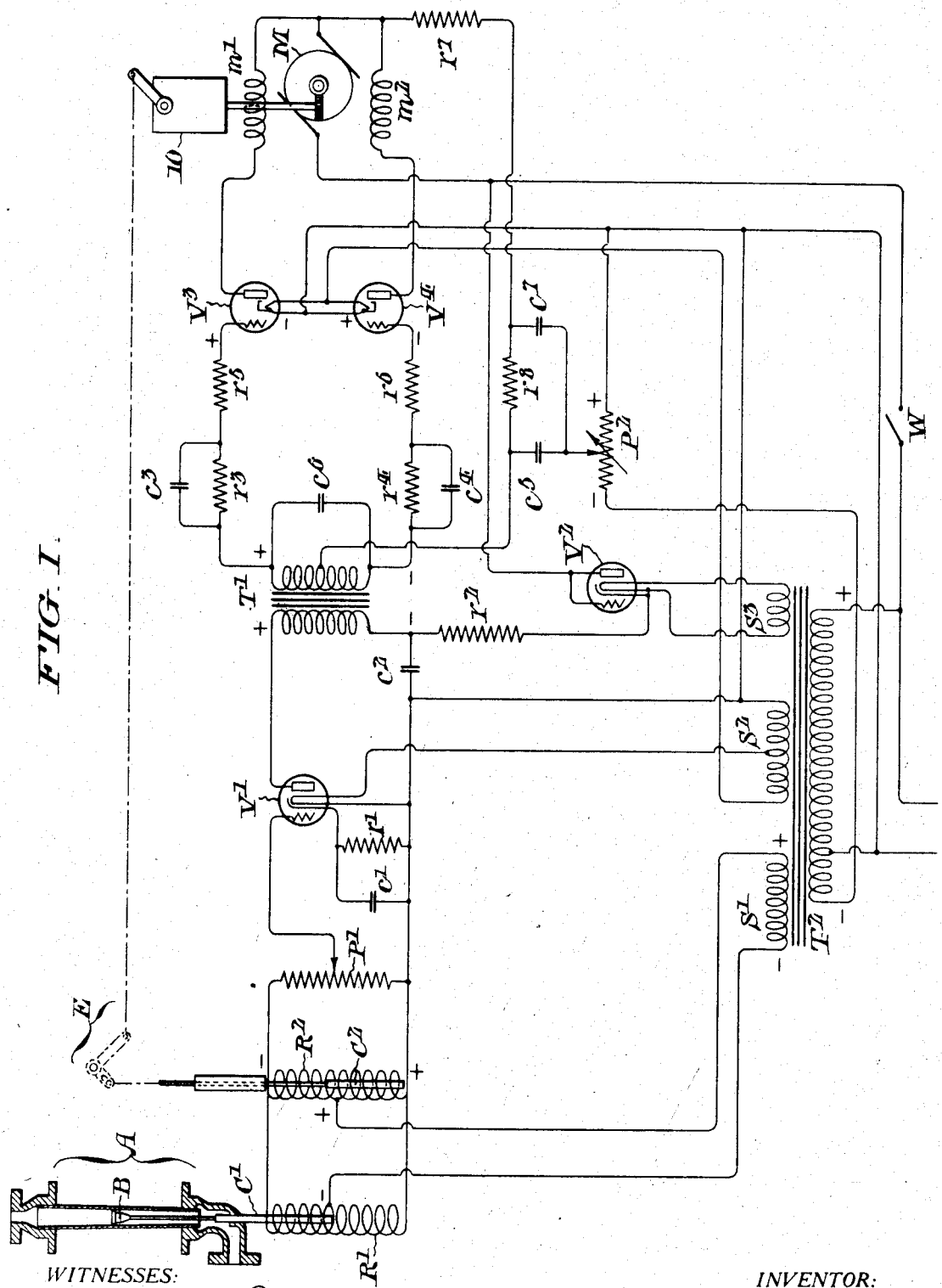
FIG. I.
WITNESSES:
Thomas W. Kerr, Jr
John A. Weidler
INVENTOR:
Carl C. Chambers,
BY Fraley Paul
ATTORNEYS.

April 11, 1939.　　　C. C. CHAMBERS　　　2,154,375
COMPENSATED CONTROL SYSTEM
Filed April 25, 1936　　　3 Sheets-Sheet 2
FIG. II.
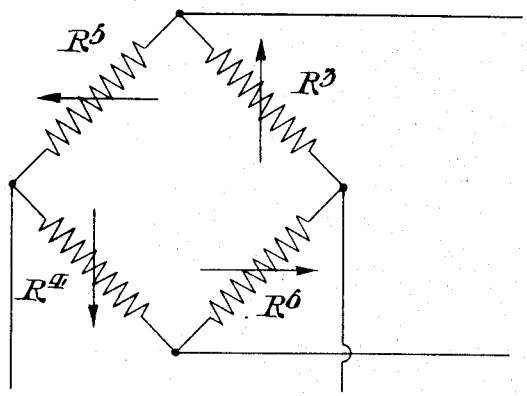
FIG. III.
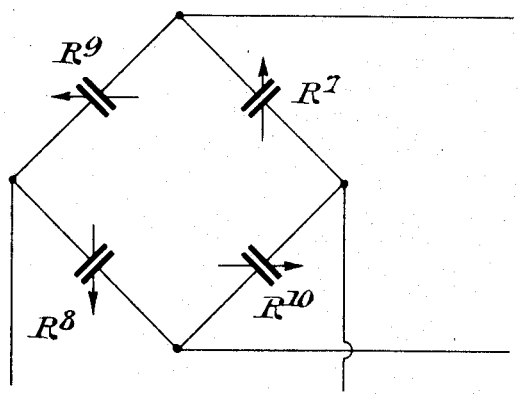
FIG. IV.
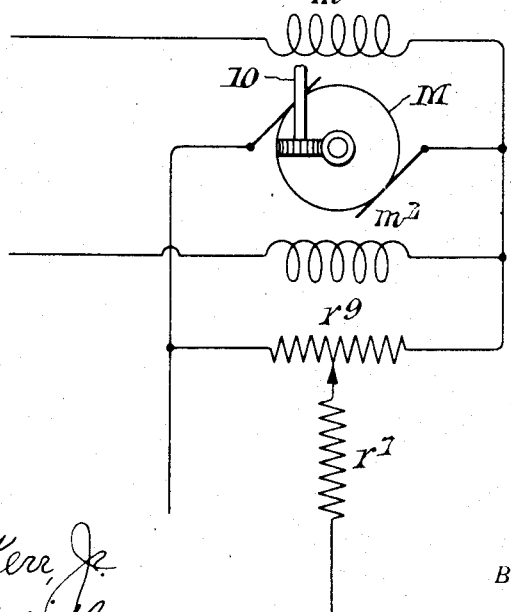
WITNESSES:
Thomas W. Kerr, Jr.
John A. Weidler
INVENTOR:
Carl C. Chambers,
BY Fraley & Paul
ATTORNEYS.

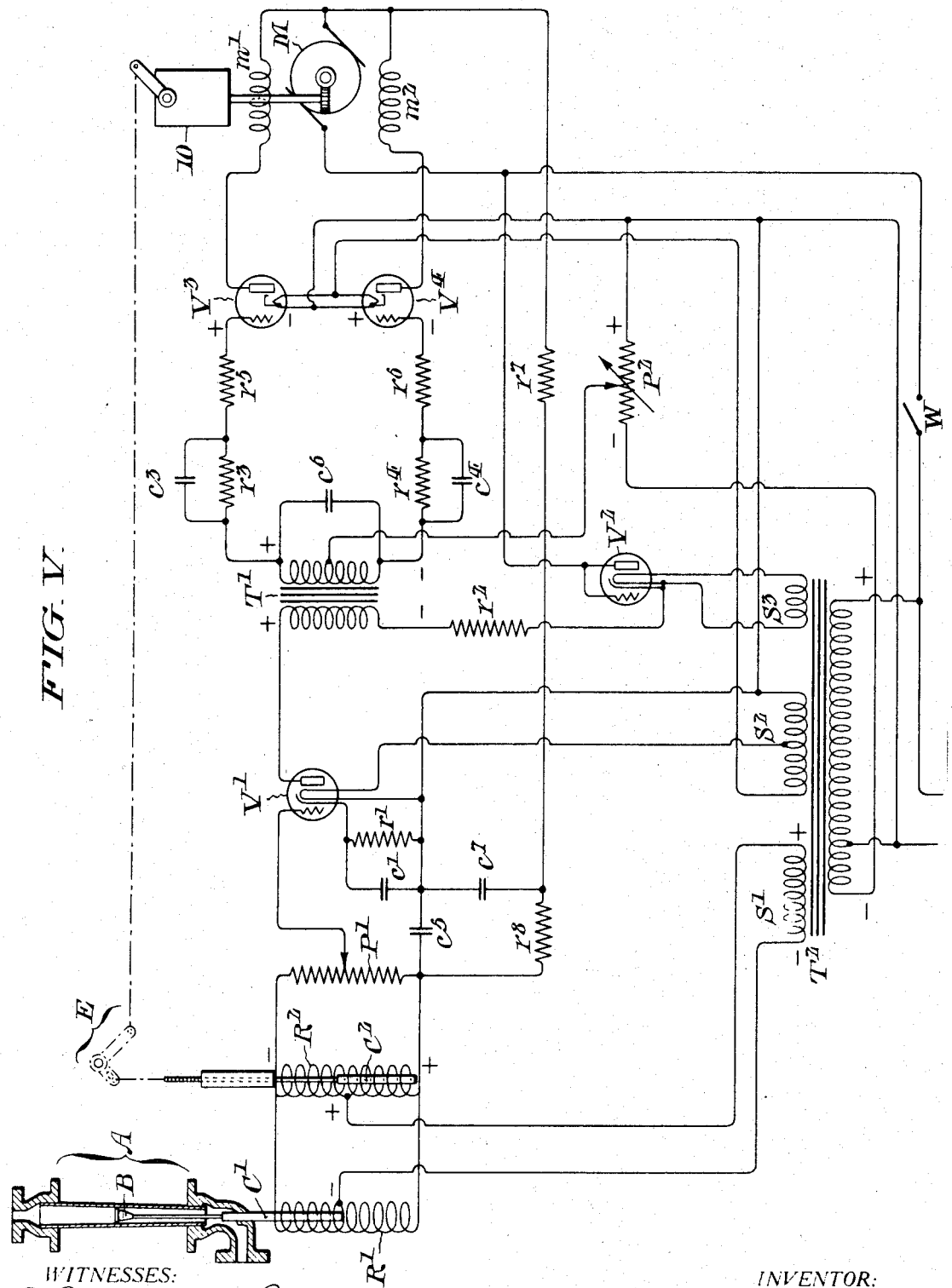
FIG. V

Patented Apr. 11, 1939

2,154,375

UNITED STATES PATENT OFFICE 2,154,375

COMPENSATED CONTROL SYSTEM

Carl C. Chambers, Lansdowne, Pa., assignor to Brooke Engineering Company, Inc., Philadelphia, Pa., a corporation of Pennsylvania Application April 25, 1936, Serial No. 76,367

12 Claims. (Cl. 172—239)

This invention relates to a novel means for effecting compensated control in the operation of regulating systems whose operating conditions are susceptible of variation and more particularly to an electrical automatic control system which is self-compensating.

Heretofore automatic control systems have had the disadvantage of over-correction which is due to the inertia arising from relatively fast correction near the neutral or correction point corresponding with the normal condition of the system being controlled. This difficulty is known as "over-travel" and the resulting series of "over-travels" is termed "hunting". This is a serious disadvantage because while the control system is "hunting", it is not controlling. A further difficulty inherent in non-compensated control systems is connected with the problem of time-lag which is the time that it takes for a change at the control mechanism to bring about a measurable change in the system being controlled. Unless the control system operates in such a way as to allow for this time-lag, corrections will not coincide with the requirements of the system being controlled.

One of the objects of the present invention is to provide an electrical control system which will energize a control device in response to variations in the condition of the medium controlled with the period of energization of the control device dependent upon the extent of the variations in the medium controlled. A further object is to provide an electrical control system which will energize a control device in response to variations in the condition of the medium controlled with the period of energization of the control device dependent upon the rate of change of the variations in the medium controlled. A still further object is to provide an electrical control system which will actuate a control device at progressively shorter intervals as the medium being controlled approaches normal. Another object is to provide an electrical control system which will energize a control device in response to an effected voltage and at the same time furnish a counteraction to the effected voltage through energization of the control device.

In the drawings

Fig. I is a diagrammatic showing of one of the embodiments of the present invention.

Fig. II is a diagrammatic showing of a resistance bridge network.

Fig. III is a diagrammatic showing of a capacity bridge network.

Fig. IV is a diagrammatic showing of an arrangement for obtaining variable feed-back.

Fig. V is a diagrammatic view showing the delivery of feed-back to the amplifier tube.

In Fig. I, $R^1$ and $R^2$ are coreless center tapped coils within which are suspended movable magnetic cores $C^1$ and $C^2$. The magnetic core $C^1$ is connected by way of a non-magnetic rod with any suitable actuating means which will vary in position in accordance with changes in the condition of the system being controlled. The device shown at A operates in this fashion since the element B will rise or fall depending upon the rate of flow through A. However, other variable devices, as for instance a pressure responsive diaphragm, may be used in place of the flow device A. The coils $R^1$ and $R^2$ are connected by way of center taps across a potential at the winding $S^1$. The magnetic core $C^2$ is adjustable to a control scale and variations in its position within the coil $R^2$ serve to vary two arms of a bridge composed of the four divisions of the center tapped coils $R^1$ and $R^2$. The core $C^2$ can thus be set to give the desired balancing value which in turn will determine the position at which the movable core $C^1$ will balance the bridge. At the point of balance there will be no voltage impressed upon the grid of the amplifying tube $V^1$. Variations either side of balance will effect a voltage which will vary in phase depending upon which side of balance the bridge has been thrown. $P^1$ is a potentiometer which serves as a sensitivity control since it gives a means of varying the portion of the voltage from the bridge which reaches the grid of the amplifying tube $V^1$. $c^1$ is a grid bias by-pass condenser and $r^1$ is a self-bias resistor. The voltage impressed upon the grid of the amplifying tube $V^1$ is amplified and impressed on the grids of the rectifier tubes $V^3$ and $V^4$ through the push-pull transformer $T^1$. The plate voltage on the amplifying tube $V^1$ is obtained through the rectifying tube $V^2$. The resistance $r^2$ and condenser $c^2$ serve to smooth out the ripple in the rectified voltage delivered by the tube $V^2$. In some instances the amplification step may be omitted. Where this is done the amplifying tube $V^1$ together with the condenser $c^1$ and the resistor $r^1$ may be omitted. The rectifier tube $V^2$ together with the resistor $r^2$ and the condenser $c^2$ would also be omitted. $c^6$ is a condenser across the secondary of the transformer $T^1$, its function being to maintain a smooth cycle system. $c^3$ and $c^4$ are condensers which, acting in conjunction with the resistances $r^3$, $r^4$, $r^5$ and $r^6$, store the grid charges of the tubes V³ and V⁴. The tubes V³ and V⁴ are preferably grid-controlled rectifiers as for instance Thyratrons. M is a split-field series A-C motor, the fields being shown at $m^1$ and $m^2$. The motor M is connected through a gear train 10 to a suitable control valve or the like. Of course it is to be understood that any suitable electrically actuated device may be used in place of the motor M, such as a solenoid or merely a heating coil, and it is also to be noted that a single field device or the like may be used in which case one of the tubes V³, V⁴ would be omitted. $r^7$ is a resistance in a line which feeds back to the transformer T¹ and thence to the grids of the tubes V³ and V⁴. The resistances $r^7$, $r^8$ and the condensers $c^5$ and $c^7$ comprise a network for the storing of the charge in the feed-back circuit. P² is a variable resistance for adjusting the bias on V³ and V⁴ to a point where these tubes will not deliver current until there is an impression of a critical voltage across the transformer T¹. In some cases performance of the control system is improved by varying the point of balance of the bridge in accordance with variations of the control mechanism. This is shown diagrammatically in Fig. I at E. Where control is desired over an extended range the voltage fed through the resistance $r^7$ and the network comprising $c^5$, $c^7$ and $r^8$ may be amplified. T² is a transformer with secondary windings at S¹, S² and S³. The winding S¹ supplies the voltage to the coils R¹ and R². The winding S² supplies the filament voltages for the amplifying tube V¹ and for the rectifying tubes V³ and V⁴. The winding S³ supplies the filament voltage for the rectifying tube V². W is a switch for turning the control system off and on.

When the switch W is closed the system operates as follows: A change in the condition of the medium being controlled will cause the magnetic core C¹ to rise or fall, depending upon the direction of change within the coil R¹. As a result the bridge network comprising the coils R¹ and R² with the cores C¹ and C² is thrown out of balance, thus effecting a potential difference across the resistance P¹. This potential difference will have a phase characteristic corresponding to the position of the core C¹ within the coil R¹. Where an extended range of sensitivity is desired this voltage may be amplified by any suitable means of amplification, as for instance, the arrangement shown at the tube V¹ in Fig. I. It is to be understood, however, that this amplification step may be omitted in cases where extended sensitivity is not needed. The effected voltage hereinafter referred to as "signal" voltage is then impressed upon the grid circuit of one or more electron tubes in circuit with a motor or other control actuating device. This circuit may be either to the field or to the armature of the motor. Where it is desired to effect more than a unidirectional rotation of the motor an arrangement using two or more electron tubes is necessary. One such suitable arrangement is shown in Fig. I. The tubes V³ and V⁴ are in circuit with the field coils $m^1$ and $m^2$, respectively, and these field coils are so wound that the energization of the field coil $m^1$ will result in a rotation of the motor in one direction; whereas energization of field coil $m^2$ will result in a rotation in the opposite direction. The phase of the signal voltage effected at the bridge network is determined by the position of the core C¹ and this phase characteristic will be the deciding factor in the firing of the tubes V³ or V⁴ since only one of these tubes—that tube which is in phase with the portion of the signal voltage impressed in its grid circuit—will fire at any given instant in response to the impressed signal voltage. Therefore the direction of rotation of the motor M will be directly dependent upon the phase of the signal voltage as determined by the direction of departure from normal in the medium to be regulated.

When current is flowing in the plate circuit of the electron tube actuated by the signal voltage, and when the motor is being energized, the potential at the point between the armature and the fields of the motor will be negative with respect to the potential at the cathode of the electron tube. This negative potential is impressed upon the grid of the electron tube by any suitable means, as for instance, as shown in Fig. I. This arrangement includes the resistances $r^7$ and $r^8$ together with the condensers $c^5$ and $c^7$ and effects a storing of the negative charge occurring on the energization of the control device. Since the electron tube delivers current only in the positive half cycles of the signal voltage, and since this delivery of current will take place only when the signal voltage exceeds the critical voltage of the tube, the negative charge so stored will counteract against the force of the signal voltage and where this counteraction is great enough the impressed voltage at the grid of the tubes V³ and V⁴ will fall below the critical voltage and hence the tube will cease to deliver current. During the time that the electron tube is delivering current, the condenser in the grid circuit shown at $c^3$ in Fig. I, in conjunction with the resistances $r^3$ and $r^5$, will be storing positive charges by virtue of the ionization in the electron tube V³ and the negative potential being built up across $c^5$. Therefore the condition of the circuit at the instant when the negative counteraction from the energization of the control device is sufficient to cause the tube to cease delivering current is that the condenser $c^3$ has a positive charge and the condenser $c^5$ has a negative charge. The values of the condensers $c^3$, $c^4$ and $c^5$ and the values of the resistances $r^3$, $r^4$, $r^7$ and $r^8$ are such that the product of the capacity of the condenser $c^3$ and the resistance of the resistance $r^3$ and the product of the capacity of the condenser $c^4$ and the resistance of the resistance $r^4$ are less than the product of the capacity of the condenser $c^5$ and the sum of the resistances of the resistances $r^8$ and $r^7$. Therefore the condenser $c^3$ will discharge quicker than the condenser $c^5$ and as these condensers discharge the voltage across them will decrease. The concurrent action of these diminishing voltages results in the desired compensation as hereinafter described.

The compensating action may be approximated by considering the charge on the grid due to the action of the condenser $c^3$ and the resistance $r^3$ in combination with the action of the condenser $c^5$ together with the resistances $r^8$ and $r^7$ to be represented by the expression $-(E_2-E_1)$ where $E_2$ represents the voltage due to the charge stored in the condenser $c^5$, and $E_1$ represents the voltage due to the charge stored in the condenser $c^3$. The expression $-(E_2-E_1)$ represents the sum of the voltages across the condensers $c^3$ and $c^5$. In order to obtain the desired compensation it is imperative that the initial rate of change of $E_1$ exceed the initial rate of change of $E_2$. So long as the rate of decrease in $E_1$ exceeds that of $E_2$ the total bias on the grid will increase negatively and hence an increased signal voltage will be required to cause the tube V³ to deliver current again. The condenser $c^3$ will reach a condition of substantial discharge before the condenser $c^5$ and therefore the system will ultimately reach a point where the rate of discharge of the condenser $c^5$ will exceed the rate of discharge of the condenser $c^3$. From this point on, the negative bias on the grid will decrease until the resultant of the counteraction of the signal voltage against the feed-back will be sufficient to cause the tube $V^3$ to deliver current. The cycle will then be repeated. It will be seen that the above system operates in such a way that energization of the control device is accomplished by means of groups of impulses, each impulse being of substantially constant intensity. As the value of the signal voltage changes, the intensity of energization remains substantially constant, but the periods between groups of impulses is varied. It will also be seen that the effect of the feed-back circuit is to counteract against the force of the signal voltage by tending to lengthen the periods between groups of impulses but that the intensity of the impulses is not substantially changed by the effect of the feed-back.

It is to be understood that the system described may be modified in many of its details without departing from the spirit or scope of the invention. For instance, the balancing network comprising the coils $R^1$, $R^2$ and the cores $C^1$ and $C^2$ may be replaced with a resistance network such as shown in Fig. II. $R^3$, $R^4$, $R^5$ and $R^6$ are variable resistances one or more of which may be varied in accordance with changes in the condition of the medium being controlled. Similarly a capacity network may be used such as is shown in Fig. II where $R^7$, $R^8$, $R^9$ and $R^{10}$ are variable condensers.

The feed-back network comprising the condensers $c^5$ and $c^7$, and the resistances $r^7$ and $r^8$ may be modified in a number of ways. In some cases, for instance, the condenser $c^7$ and the resistance $r^8$ may be omitted entirely being replaced by direct connections. It is also possible to vary the feed-back connections to the motor M in such a way as to give a variable bias. One such arrangement is shown in Fig. IV where $r^9$ is an adjustable resistance inserted across the armature of the motor M.

Where the signal voltage has been amplified the feed-back may be impressed on the grid circuit of the amplifying tube. This arrangement may be used either alone or in conjunction with feed-back to the tubes $V^3$ and $V^4$. One arrangement for applying the feed-back to the amplifying tube $V^1$ is shown in Fig. V.

The present invention has many advantages over other control systems heretofore in use. Since the signal voltage is effected by the movement of an element which does no mechanical work, it is possible to obtain exceedingly high accuracy and sensitivity. Another advantage arises from the fact that the energizing and compensating factors are both electrical and hence are applied practically instantaneously. Moreover, there are no moving parts in the compensation circuit and therefore uniform compensation is assured at all times.

Having thus described my invention, I claim:

1. In a compensated control system, means for effecting a signal voltage upon a departure from a predetermined normal in the condition of the medium to be regulated, said voltage being a function of the condition of the medium to be regulated, a control device for actuating a control mechanism to restore the regulated medium to said normal condition, an electron tube having said signal voltage impressed thereon, said tube being in circuit with said control device, means whereby variations in the signal voltage cause said electron tube to deliver energization impulses to said control device, means whereby the intensity of such energization is maintained substantially constant, but the periods between groups of impulses are caused to vary dependent upon the value of said signal voltage, and means whereby the energization of the control device counteracts against the force of said signal voltage by tending to lengthen the periods between groups of impulses of substantially constant intensity from said electron tube to said control device.

2. In a compensated control system, means for effecting a signal voltage upon a departure from a predetermined normal in the condition of the medium to be regulated, said voltage being a function of the condition of the medium to be regulated, a motor for actuating a control mechanism to restore the regulated medium to said normal condition, an electron tube having said signal voltage impressed thereon, said tube being in circuit with said motor, means whereby variations in the signal voltage cause said electron tube to deliver energization impulses to said motor, means whereby the intensity of such energization is maintained substantially constant, but the periods between groups of impulses are caused to vary dependent upon the value of said signal voltage, whereby the motor when operating runs at full load torque, and means whereby the energization of the motor counteracts against the force of said signal voltage by tending to lengthen the periods between groups of impulses of substantially constant intensity from said electron tube to said motor.

3. In a compensated control system, means for effecting a signal voltage upon a departure from a predetermined normal condition in the medium to be regulated, said voltage being a function of the condition of the medium to be regulated and varying as to phase with the direction of departure from normal, a motor for actuating a control mechanism to restore the regulated medium to said normal condition, electron tubes having said signal voltage impressed thereon, said tubes being in circuit with said motor, means whereby variations in the signal voltage cause said electron tubes to deliver energization impulses to said motor, means whereby the intensity of such energization is maintained substantially constant, but the periods between groups of impulses are caused to vary dependent upon the value of said signal voltage and the direction of rotation of said motor is made dependent on the phase of said signal voltage, whereby the motor when operating runs at full load torque, and means whereby the energization of the motor counteracts against the force of said signal voltage by tending to lengthen the periods between groups of impulses of substantially constant intensity from said electron tubes to said motor.

4. In a compensated control system, means for effecting a signal voltage upon a departure from a predetermined normal condition in the medium to be regulated, said voltage being a function of the condition of the medium to be regulated and varying as to phase with the direction of departure from normal, means for amplifying said signal voltage, a motor for actuating a control mechanism to restore the regulated medium to said normal condition, said motor having field coils, electron tubes having said signal voltage impressed thereon, said tubes being in circuit with said field coils, means whereby variations in the signal voltage cause said electron tubes to deliver energization impulses to said motor, means whereby the intensity of such energization is maintained substantially constant, but the periods between groups of impulses are caused to vary dependent upon the value of said signal voltage and the direction of rotation of said motor is made dependent on the phase of said signal voltage, whereby the motor when operating runs at full load torque, and means whereby the energization of the motor counteracts against the force of said signal voltage by tending to lengthen the periods between groups of impulses of substantially constant intensity from said electron tubes to said motor.

5. In a compensated control system, means for effecting a signal voltage upon a departure from a predetermined normal condition in the medium to be regulated, said voltage being a function of the condition of the medium to be regulated and varying as to phase with the direction of departure from normal, means for amplifying said signal voltage, a motor for actuating a control mechanism to restore the regulated medium to said normal condition, said motor having field coils, electron tubes having said signal voltage impressed thereon, said tubes being in circuit with said field coils, means whereby variations in the signal voltage cause said electron tubes to deliver energization impulses to said motor, means whereby the intensity of such energization is maintained substantially constant but the periods between groups of impulses are caused to vary dependent upon the force and rate of change of said signal voltage and the direction of rotation of said motor is made dependent on the phase of said signal voltage, whereby the motor when operating runs at full load torque, and means whereby the energization of the motor counteracts against the force of said signal voltage by tending to lengthen the periods between groups of impulses of substantially constant intensity from said electron tubes to said motor.

6. In a compensated control system, means comprising a balancing network for effecting a signal voltage upon a departure from a predetermined normal in the condition of the medium to be regulated, said voltage being a function of the condition of the medium to be regulated, a motor for actuating a control mechanism to restore the regulated medium to said normal condition, an electron tube having said signal voltage impressed thereon, said tube being in circuit with said motor, means whereby variations in the signal voltage cause said electron tube to deliver energization impulses to said motor, means whereby the intensity of such energization is maintained substantially constant, but the periods between groups of impulses are caused to vary dependent upon the value of said signal voltage, whereby the motor when operating runs at full load torque, and means whereby the energization of the motor counteracts against the force of said signal voltage by tending to lengthen the periods between groups of impulses of substantially constant intensity from said electron tube to said motor.

7. In a compensated control system, means comprising a balancing network for effecting a signal voltage upon a departure from a predetermined normal in the condition of the medium to be regulated, said voltage being a function of the condition of the medium to be regulated, means for amplifying said signal voltage, a motor for actuating a control mechanism to restore the regulated medium to said normal condition, an electron tube having said signal voltage impressed thereon, said tube being in circuit with said motor, means whereby variations in the signal voltage cause said electron tube to deliver energization impulses to said motor, means whereby the intensity of such energization is maintained substantially constant, but the periods between groups of impulses are caused to vary dependent upon the value of said signal voltage, whereby the motor when operating runs at full load torque and means whereby the energization of the motor counteracts against the force of said signal voltage by tending to lengthen the periods between groups of impulses of substantially constant intensity from said electron tube to said motor.

8. In a compensated control system, means comprising a balancing network for effecting a signal voltage upon a departure from a predetermined normal condition in the medium to be regulated, said voltage being a function of the condition of the medium to be regulated and varying as to phase with the direction of departure from normal, means for amplifying said voltage, a motor for actuating a control mechanism to restore the regulated medium to said normal condition, said motor having field coils, electron tubes having said signal voltage impressed thereon, said tubes being in circuit with said field coils, means whereby variations in the signal voltage cause said electron tubes to deliver energization impulses to said motor, means whereby the intensity of such energization is maintained substantially constant, but the periods between groups of impulses are caused to vary dependent upon the value of said signal voltage and the direction of rotation of said motor is made dependent on the phase of said signal voltage, whereby the motor when operating runs at full load torque, and means whereby the energization of the motor counteracts against the force of said signal voltage by tending to lengthen the periods between groups of impulses of substantially constant intensity from said electron tubes to said motor.

9. In a compensated control system, means comprising a bridge-like network for effecting a signal voltage upon a departure from a predetermined normal condition in the medium to be regulated, said voltage being a function of the condition of the medium to be regulated and varying as to phase with the direction of departure from normal, means for amplifying said voltage, a motor for actuating a control mechanism to restore the regulated medium to said normal condition, said motor having field coils, electron tubes having said signal voltage impressed thereon, said tubes being in circuit with said field coils, means whereby variations in the signal voltage cause said electron tubes to deliver energization impulses to said motor, means whereby the intensity of such energization is maintained substantially constant, but the periods between groups of impulses are caused to vary dependent upon the force of said signal voltage and the direction of rotation of said motor is made dependent on the phase of said signal voltage, whereby the motor when operating runs at full load torque, means whereby the energization of the motor counteracts against the force of said signal voltage by tending to lengthen the periods between groups of impulses of substantially constant intensity from said electron tubes to said motor, and means whereby the balance point of the bridge-like network is varied in accordance with changes in position of the control mechanism.

10. In a compensated control system, means comprising a bridge-like network for effecting a signal voltage upon a departure from a predetermined normal condition in the medium to be regulated, said voltage being a function of the condition of the medium to be regulated and varying as to phase with the direction of departure from normal, means for amplifying said voltage, a motor for actuating a control mechanism to restore the regulated medium to said normal condition, said motor having field coils, electron tubes having said signal voltage impressed thereon, said tubes being in circuit with said field coils, means whereby variations in the signal voltage cause said electron tubes to deliver energization impulses to said motor, means whereby the intensity of such energization is maintained substantially constant, but the periods between groups of impulses are caused to vary dependent upon the force and rate of change of said signal voltage and the direction of rotation of said motor is made dependent on the phase of said signal voltage, whereby the motor when operating runs at full load torque, means whereby the energization of the motor counteracts against the force of said signal voltage by tending to lengthen the periods between groups of impulses of substantially constant intensity from said electron tubes to said motor, and means whereby the balance point of the bridge-like network is varied in accordance with changes in position of the control mechanism.

11. In a system of the character described including a control device, means for the delivery of energizing impulses to said control device, the intensity of such energization being substantially constant, and means whereby the energization of the control device produces a counteracting force tending to lengthen the periods between groups of energization impulses without substantially altering the intensity of energization of said impulses.

12. In a system of the character described including a motor, means for the delivery of energizing impulses to said motor, the intensity of such energization being substantially constant, and means whereby the energization of the motor produces a counteracting force tending to lengthen the periods between groups of energization impulses without substantially altering the intensity of energization of said impulses.

CARL C. CHAMBERS.